(12) United States Patent
Takeda et al.

(10) Patent No.: US 9,592,834 B2
(45) Date of Patent: Mar. 14, 2017

(54) VEHICLE ENVIRONMENT RECOGNIZING APPARATUS

(75) Inventors: Fuminori Takeda, Atsugi (JP); Taku Takahama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 1396 days.

(21) Appl. No.: 13/053,684

(22) Filed: Mar. 22, 2011

(65) Prior Publication Data

US 2011/0238252 A1 Sep. 29, 2011

(30) Foreign Application Priority Data

Mar. 26, 2010 (JP) .................................. 2010-072451
Nov. 11, 2010 (JP) .................................. 2010-252816

(51) Int. Cl.
*B60W 40/072* (2012.01)
*B60W 40/076* (2012.01)
*G06K 9/00* (2006.01)

(52) U.S. Cl.
CPC ........ *B60W 40/072* (2013.01); *B60W 40/076* (2013.01); *G06K 9/00798* (2013.01); *G06T 7/73* (2017.01); *B60W 2420/42* (2013.01); *B60W 2520/125* (2013.01); *B60W 2520/14* (2013.01); *G06T 2207/20061* (2013.01); *G06T 2207/30252* (2013.01); *G06T 2207/30256* (2013.01)

(58) Field of Classification Search
USPC ............................ 701/28, 523; 382/104, 199
See application file for complete search history.

(56) References Cited

U.S. PATENT DOCUMENTS

| 4,942,533 | A | 7/1990 | Kakinami et al. |
| 5,359,666 | A | 10/1994 | Nakayama et al. |
| 9,286,523 | B2 * | 3/2016 | Guan ................. G06K 9/00798 |
| 9,489,583 | B2 * | 11/2016 | Kojima ............. G06K 9/00798 |

(Continued)

FOREIGN PATENT DOCUMENTS

| EP | 1681577 | 7/2006 |
| JP | 2-90379 A | 3/1990 |

(Continued)

OTHER PUBLICATIONS

English translation of JP 2002259995.*

(Continued)

*Primary Examiner* — Jonathan M Dager
(74) *Attorney, Agent, or Firm* — Global IP Counselors, LLP

(57) ABSTRACT

A vehicle environment recognizing apparatus comprises an image capturing device, a road shape calculating section and a straight road determining section. The image capturing device is configured to capture an image of a road on which a vehicle is traveling. The road shape calculating section is configured to calculate approximation lines that approximate a shape of the road in at two least regions that are located at different distances in front of the vehicle based on image data captured by the image capturing device. The straight road determining section is configured to determine whether the road on which the vehicle is traveling is straight based on a degree to which the approximation lines of the regions calculated by the road shape calculating section match one another.

13 Claims, 9 Drawing Sheets

(56) References Cited

U.S. PATENT DOCUMENTS

| | | | |
|---|---|---|---|
| 2005/0096826 A1* | 5/2005 | Iwasaka et al. | 701/70 |
| 2006/0002587 A1* | 1/2006 | Takahama | B60R 1/00 |
| | | | 382/103 |
| 2009/0018767 A1 | 1/2009 | Gehring et al. | |
| 2010/0191421 A1* | 7/2010 | Nilsson | 701/41 |
| 2014/0118552 A1* | 5/2014 | Takahama | G06K 9/00798 |
| | | | 348/148 |
| 2015/0220793 A1* | 8/2015 | Kiyohara | G06K 9/00805 |
| | | | 382/103 |

FOREIGN PATENT DOCUMENTS

| | | | |
|---|---|---|---|
| JP | 9-189517 A | | 7/1997 |
| JP | 11-337310 A | | 12/1999 |
| JP | 2000-242899 A | | 9/2000 |
| JP | 2002259995 | * | 9/2002 |
| JP | 2004-247979 | | 9/2004 |

OTHER PUBLICATIONS

An English translation of the Chinese Office Action of corresponding Chinese Application No. 201110074805.7, issued on Jun. 29, 2012.

The extended European Search Report of corresponding European Patent Application No. 11002471.8-2421, dated Jul. 14, 2011.

An English translation of the Japanese Office Action for the corresponding Japanese patent application No. 2010-252816 issued on Jun. 17, 2014.

* cited by examiner

VEHICLE ENVIRONMENT RECOGNIZING APPARATUS

CROSS-REFERENCE TO RELATED APPLICATIONS

This application claims priority to Japanese Patent Application No. 2010-072451 filed on Mar. 26, 2010 and Japanese Patent Application No. 2010-252816 filed on Nov. 11, 2010. The entire disclosures of Japanese Patent Application No. 2010-072451 and 2010-252816 are hereby incorporated herein by reference.

BACKGROUND

Field of the Invention apparatus for recognizing an environment surrounding a vehicle. More specifically, the present invention relates to a vehicle environment recognizing apparatus that determines The present invention generally relates to a vehicle environment recognizing a degree of curvature of a road on which a vehicle is traveling and, more particularly, for determining if the road is straight.

Background Information

Conventional technology has been proposed for recognizing an environment surrounding a vehicle. An example of such a technology is a white line recognizing apparatus that is disclosed in Japanese Laid-Open Patent Publication No. 2000-242899. The white line recognizing apparatus disclosed in Japanese Laid-Open Patent Publication No. 2000-242899 uses an onboard camera to capture an image of a road in front of the vehicle, and calculates straight lines (approximation lines) approximating a left white line and a right white line by detecting white line candidate points in the road image. Then, a degree of curvature of the road is determined based on a deviation between the approximation lines and the white line candidate points. If the road is linear (straight), then an intersection point of the left and right approximation lines is treated as an imaginary vanishing point. Additionally, a detection frequency histogram for imaginary vanishing points is crated and an optical axis direction is estimated based on a maximum frequency value. The estimated optical axis direction is used to execute an optical axis revision with respect to the onboard camera.

SUMMARY

It has been discovered that the technology presented in Japanese Laid-Open Patent Publication No. 2000-242899 does not determine if the road is straight with a higher degree of precision based on a deviation between white line candidate points and approximation lines. Thus, there exists a need for a system that can determine if a road is straight with a higher degree of precision.

In view of the state of the known technology, one aspect of the present disclosure is to provide a vehicle environment recognizing apparatus that can achieve a more accurate straight road determination.

In order to achieve the aforementioned aspect, a vehicle environment recognizing apparatus is proposed that comprises an image capturing device, a road shape calculating section and a straight road determining section. The image capturing device is configured to capture an image of a road on which a vehicle is traveling. The road shape calculating section is configured to calculate approximation lines that approximate a shape of the road in at least two regions that are located at different distances in front of the vehicle based on image data captured by the image capturing device. The straight road determining section is configured to determine whether the road on which the vehicle is traveling is straight based on a degree to which the approximation lines of the regions calculated by the road shape calculating section match one another.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
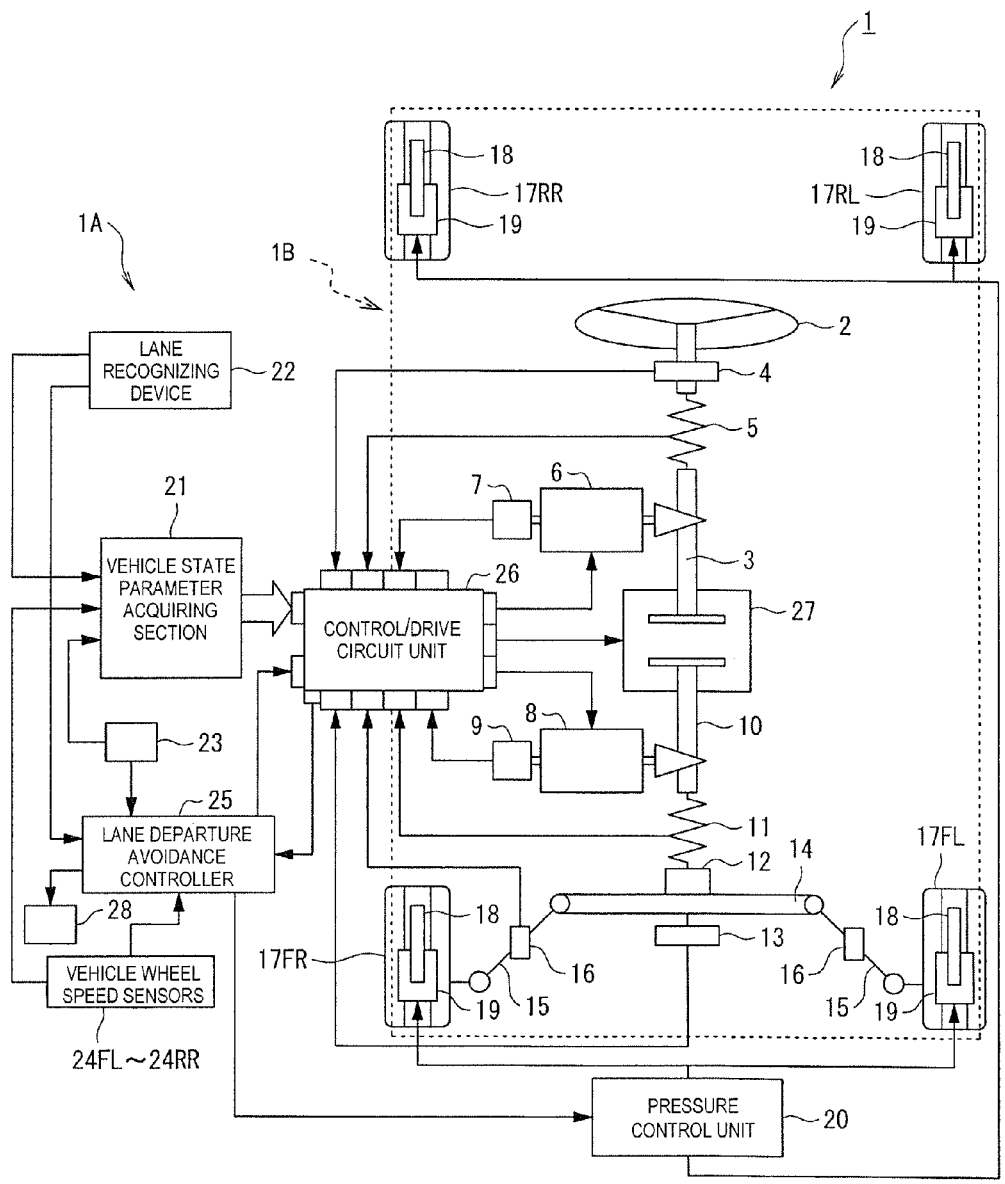
FIG. 1 is a schematic view of a host vehicle equipped with a vehicle environment recognizing apparatus in accordance with one illustrated embodiment.

Referring initially to FIG. 1, a vehicle 1 is schematically illustrated that is equipped with a vehicle environment recognizing apparatus 1A in accordance with one illustrated embodiment. As explained below, with the vehicle environment recognizing apparatus 1A, a straight road determination precision is improved because the determination as to whether or not a road on which the vehicle 1 is traveling in straight is made based on straight lines that approximate the road shape in a plurality of regions in front of the vehicle. In other words, as explained below, based on a lane recognition result, the vehicle environment recognizing apparatus 1A calculate road shape approximation lines approximating a shape of a road on which a vehicle is traveling are calculated with respect to a plurality of regions in front of the vehicle. These regions at least include a far region and a near region. A degree to which corresponding approximation lines in the respective regions match is calculated and a determination as to whether the road is straight or not is executed based on the degree of matching.

As shown in FIG. 1, the vehicle 1 includes a vehicle body 1B that supports, among other things, a steering system. The steering system of the vehicle 1 basically includes a steering wheel 2, an input-side steering shaft 3, a steering angle sensor 4, a steering torque sensor 5, a steering reaction force actuator 6, a steering reaction force actuator angle sensor 7, a turning actuator 8, a turning actuator angle sensor 9, an output-side steering shaft 10, a turning torque sensor 11, a pinion gear 12, a pinion angle sensor 13, a rack gear 14, a pair of tie rods 15 and a pair of tie rod axial force sensors 16. The vehicle body 1B is supported on the ground by a plurality of wheels 17FR, 17FL, 17RR, and 17 RL. The vehicle 1 further includes, among other things, a plurality of brake disks 18, a plurality of wheel cylinders 19, a pressure control unit 20, a vehicle state parameter acquiring section 21, a lane recognition apparatus 22, a directional indicator switch 23, wheel speed sensors 24FR, 24FL, 24RR, and 24RL, a lane departure avoidance controller 25, a control/drive circuit unit 26, a mechanical backup 27, and a buzzer 28.

Among these components of the vehicle 1, the lane recognizing device 22 constitutes an example a portion of the environment recognizing apparatus 1A. The lane recognizing device 22 also constitutes a portion of a lane departure avoidance system.

The steering system of the vehicle 1 will now be briefly discussed. The steering wheel 2 is a provided such that the steering wheel 2 turns as an integral unit with the input-side steering shaft 3. Thus, the steering wheel 2 serves to transmit a steering input force imparted from a driver to the input-side steering shaft 3. The input-side steering shaft 3 is equipped with the steering reaction force actuator 6. The steering reaction force actuator 6 serves to exert a steering reaction force in response to a steering input from the steering wheel 2.

The steering angle sensor 4 is provided on the input-side steering shaft 3. The steering angle sensor 4 serves to detect a rotational angle of the input-side steering shaft 3 (i.e., a steering input angle imparted to the steering wheel 2 by a driver). The steering angle sensor 4 sends the detected rotational angle of the input-side steering shaft 3 to the control/drive circuit unit 26. The steering torque sensor 5 is provided on the input-side steering shaft 3. The steering torque sensor 5 serves to detect a rotational torque of the input-side steering shaft 3 (i.e., a steering input torque imparted to the steering wheel 2). The steering torque sensor 5 sends the detected rotational torque of the input-side steering shaft 3 to the control/drive circuit unit 26.

The steering reaction force actuator 6 basically includes a motor having a gear fixed to a rotary shaft of the motor and the gear is arranged and configured to mesh with a gear formed on a portion of the input-side steering shaft 3. In response to an instruction from the control/drive circuit unit 26, the steering reaction force actuator 6 exerts a reaction force against rotation of the input-side steering shaft 3 by the steering wheel 2. The steering reaction force actuator angle sensor 7 is configured to detect a rotational angle of the steering reaction force actuator 6 (i.e., a rotational angle transmitted to the steering reaction force actuator 6 by a steering input) and send the detected rotational angle to the control/drive circuit unit 26.

The turning actuator 8 basically includes a motor having a gear fixed to a rotary shaft of the motor and the gear is arranged and configured to mesh with a gear formed on a portion of the output-side steering shaft 10. In response to an instruction from the control/drive circuit unit 26, the turning actuator 8 rotates the output-side steering shaft 10. The turning actuator angle sensor 9 is configured to detect a rotational angle of the turning actuator 8 (i.e., a rotational angle outputted from the turning actuator 8 for turning the wheels) and send the detected rotational angle to the control/drive circuit unit 26.

When the output-side steering shaft 10 is rotated by the turning actuator 8, it transmits rotation from the turning actuator 8 to the pinion gear 12. The turning torque sensor 11 is provided on the output-side steering shaft 10 and serves to detect a rotational torque of the output-side steering shaft 10 (i.e., a turning torque imparted to the wheels 17FR and 17FL through the rack gear 14). The turning torque sensor 11 sends the detected turning torque of the output-side steering shaft 10 to the control/drive circuit unit 26.

The pinion gear 12 meshes with the rack gear 14 and serves to transmit rotation from the output-side steering shaft 10 to the rack gear 14. The pinion angle sensor 13 is configured to detect a rotational angle of the pinion gear 12 (i.e., a turning angle of the wheels 17FR, 17FL outputted through the rack gear 14). The pinion angle sensor 13 send the detected rotational angle of the pinion gear 12 to the control/drive circuit unit 26.

The rack gear 14 has flat teeth meshed with the pinion gear 12. The rack gear 14 serves to convert rotation of the pinion gear 12 into linear motion in a widthwise direction of the vehicle 1. The tie rods 15 connect between both end portions of the rack gear 14 and respective knuckle arms of the wheels 17FR and 17FL with ball joints. The tie rod axial force sensors 16 are provided on the tie rods 15 installed on both ends of the rack gear 14. The tie rod axial force sensors 16 serve to detect axial forces acting in the tie rods 15. The tie rod axial force sensors 16 send the detected axial forces of the tie rods 15 to the control/drive circuit unit 26.

The wheels 17FR, 17FL, 17RR and 17RL are mounted to the vehicle body 1B through a suspension. A direction of the front wheels, i.e., the wheels 17FR and 17FL, with respect to the vehicle body 1B is changed by the knuckle arms being pivoted by the tie rods 15. The brake disks 18 are provided such that they rotate as integral units with the wheels 17FR, 17FL, 17RR and 17RL, respectively. When brake pads are pressed against the brake disks 18 by pushing forces imparted from the wheel cylinders 19, friction forces develop which serve as braking forces. More specifically, a brake pad is provided with respect to each of the wheels and the wheel cylinders 19 are configured to exert forces that act to press the brake pads against the brake disks 18.

The pressure control unit 20 is configured to control a pressure of the wheel cylinder 19 provided with respect to each of the wheels 17FR, 17FL, 17RR and 17RL in accordance with an instruction received from the lane departure avoidance controller 25. The vehicle state parameter acquiring section 21 acquires a status signal from the direction indicator switch 23 and an output signal from the lane recognizing device 22. The vehicle state parameter acquiring section 21 also acquires a vehicle speed based on pulse signals from the wheel speed sensors 24FR, 24FL, 24RR and 24RL, which indicate rotational speeds of the wheels. The vehicle state parameter acquiring section 21 acquires a slip rate of each of the wheels 17FR, 17FL, 17RR and 17RL based on a vehicle speed and a rotational speed of each of the wheels. The vehicle state parameter acquiring section 21 outputs the acquired parameters to the control/drive circuit unit 26.

Figure 2:
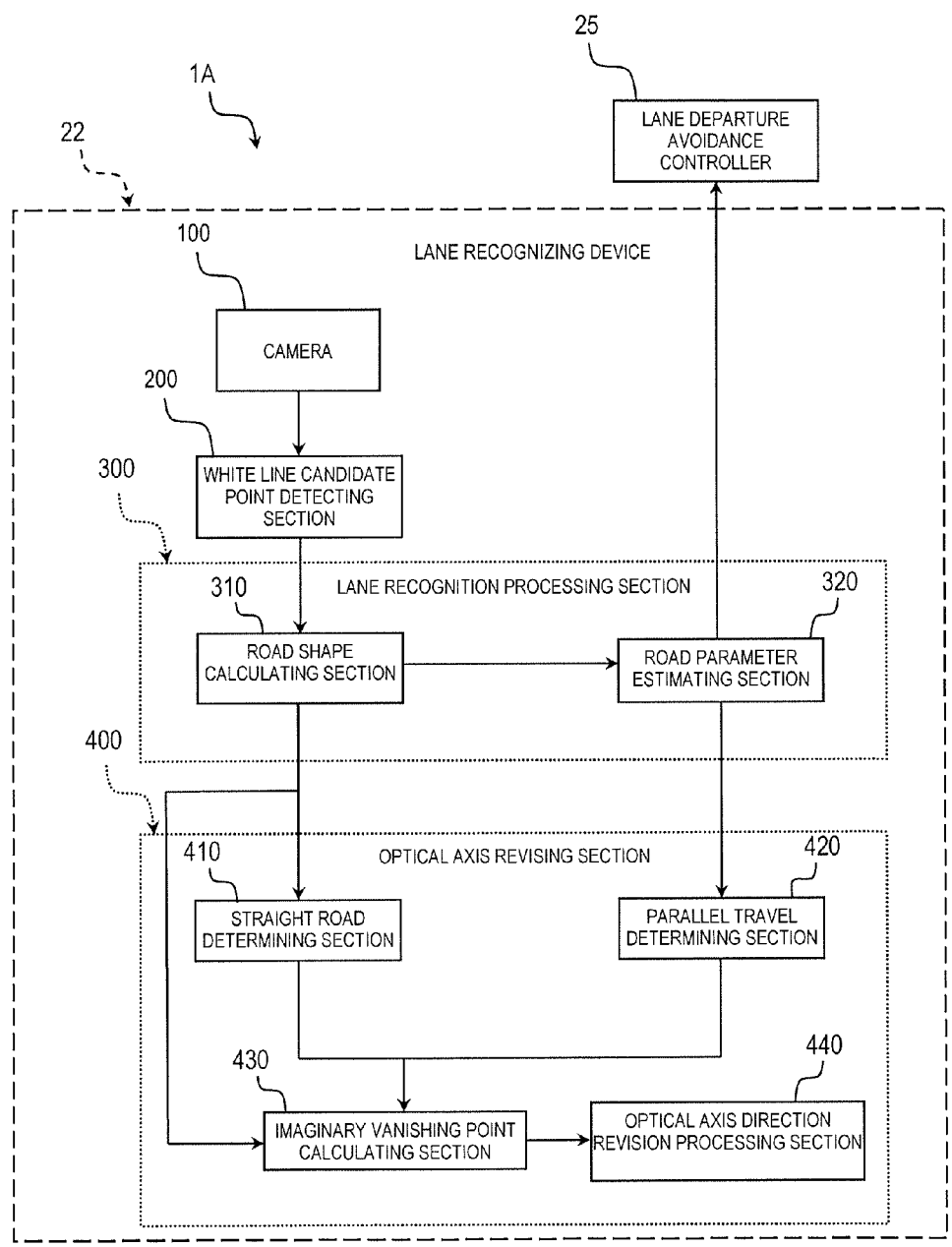
FIG. 2 is a block diagram showing basic features of a vehicle environment recognizing apparatus.

As seen in FIG. 2 and explained later, the lane recognizing device 22 basically includes at least one image capturing device (e.g., a monocular camera) and a computing device (e.g., one or more controllers). The image capturing device is configured for capturing an image of a road on which the vehicle 1 is traveling to capture images of an area surrounding the vehicle 1 (e.g., a road on which the vehicle 1 is traveling). The computing device is configured to analyze captured images and calculate a yaw angle C of the vehicle 1, a pitch angle D of the vehicle 1, a height H of the image capturing device from a road surface, a lateral displacement A from a lane center line, and a curvature B of the lane in which the vehicle 1 is traveling. The lane recognizing device 22 sends the yaw angle C of the vehicle 1, the lateral displacement A from a lane center line, and the curvature B of the road calculated by the computing device to the lane departure avoidance controller 25. This information sent by the lane recognizing device 22 to the lane departure avoidance controller 25 will hereinafter be referred to collectively as "lane departure avoidance information."

As explained later, the lane recognizing device 22 executes an optical axis revision process (explained later) based on the lateral displacement A from the lane center, the curvature B of the road, the yaw angle C of the vehicle with respect to the lane, the pitch angle D of the vehicle and the height H of the image capturing device from the road surface. The directional indicator switch 23 is configured to illuminate a directional indicator lamp suggesting a right turn or a left turn in response to an operation of a directional indicator lever by a driver. The directional indicator switch 23 sends a status signal indicating that the directional indicator lever has been operated and indicating the turn direction to be suggested to the lane departure avoidance controller 25. The wheel speed sensors 24FR, 24FL, 24RR and 24RL are configured to send pulse signals indicating a rotational speed of each of the wheels 17FR, 17FL, 17RR and 17RL to the vehicle state parameter acquiring section 21 and the lane departure avoidance controller 25.

The lane departure avoidance controller 25 receives the pulse signals indicating rotational speeds of the wheels 17FR, 17FL, 17RR and 17RL from the wheel speed sensors 24FR, 24FL, 24RR and 24RL. The lane departure avoidance controller 25 also receives the status signal indicating a turning direction from the directional indicator switch 23. The lane departure avoidance controller 25 also receives the lane departure avoidance information from the lane recognizing device 22. The lane departure avoidance controller 25 also receives information indicating a steering input state (e.g., steering input angle and steering torque) and a turning output state (turning angle and turning torque) from the control/drive circuit unit 26. The lane departure avoidance controller 25 executes a lane departure avoidance process based on the received information. In other words, the lane departure avoidance controller 25 calculates parameters related to a vehicular control (e.g., turning of the front wheels, a steering reaction force applied to the input-side steering shaft 3, and braking forces of each of the wheels) serving to control the vehicle such that the vehicle 1 travels along a targeted course within a lane. The lane departure avoidance controller 25 sends parameters related to the calculated braking forces of the wheels to the pressure control unit 20 as an instruction signal. The lane departure avoidance controller 25 also sends parameters related to the calculated turning angle of the front wheels and steering reaction force to be applied to the input-side steering shaft 3 to the control/drive circuit unit 26.

The control/drive circuit unit 26 serves to control the entire vehicle 1. The control/drive circuit unit 26 preferably includes one or more microcomputers with various control programs such as the ones discussed below, that controls various operations of the vehicle 1. For example, based on signals received from sensors installed on various parts of the vehicle 1, the control/drive unit 26 sends various control signals to the steering reaction force actuator 6, the turning actuator 8, the mechanical backup 27, etc., to control such things as the steering reaction force of the input-side steering shaft 3, the turning angle of the front wheels, and a coupling state of the mechanical backup 27.

The control/drive circuit unit 26 also converts detection values obtained from the sensors into values tailored for specific purposes. For example, the control/drive circuit unit 26 converts a rotational angle detected by the steering reaction force actuator angle sensor 7 into a steering input angle, converts a rotational angle detected by the turning actuator angle sensor 9 into a turning angle of a wheel, and converts a rotational angle of the pinion gear 12 detected by the pinion angle sensor 13 into a turning angle of a wheel.

The control/drive circuit unit 26 also sends information related to a steering input state and a turning output state to the lane departure avoidance controller 25. The control/drive circuit unit 26 monitors the rotational angle of the input-side steering shaft detected by the steering angle sensor 4, the rotational angle of the steering reaction force actuator 6 detected by the steering reaction force actuator angle sensor 7, the rotational angle of the turning actuator 8 detected by the turning actuator angle sensor 9, and the rotational angle of the pinion gear 12 detected by the pinion angle sensor 13. Based on interrelationships among these rotational angles, the control/drive circuit unit 26 detects if a failure has occurred in the steering system. If the control/drive circuit unit 26 detects a failure in the steering system, then the control/drive circuit unit 26 sends a signal to the mechanical backup 27 instructing the mechanical backup 27 to couple the input-side steering shaft 3 and the output-side steering shaft 10 together.

In response to an instruction from the control/drive circuit unit 26, the mechanical backup 27 couples the input-side steering shaft 3 and the output-side steering shaft 10 together to ensure that a torque applied to the input-side steering shaft 3 is transmitted to the output-side steering shaft 10. The mechanical backup 27 is normally instructed by the control/drive circuit unit 26 to be in an uncoupled state in which the input-side steering shaft 3 and the output-side steering shaft 10 are not coupled. If a failure occurs in the steering system and it becomes necessary to steer the vehicle 1 without depending on the steering angle sensor 4, the steering torque sensor 5, and the turning actuator 8, then the mechanical backup 27 is instructed to couple the input-side steering shaft 3 and the output-side steering shaft 10 together. The mechanical backup 27 includes, for example, a cable-type steering mechanism. The buzzer 28 emits an alarm sound to a driver in response to an instruction signal from the lane departure avoidance controller 25.

Figure 3:
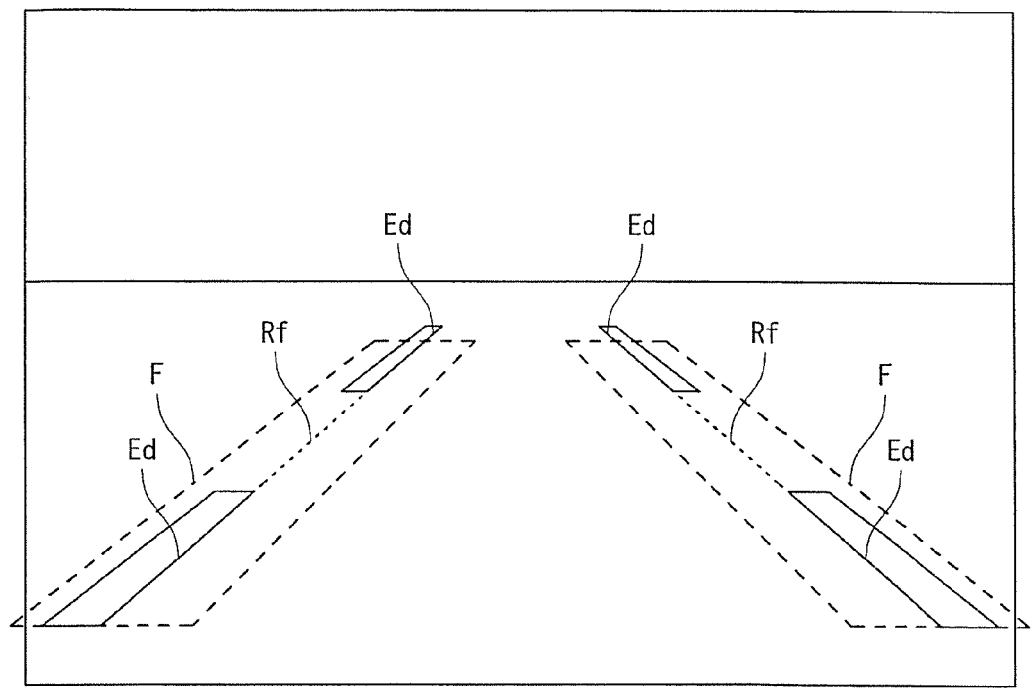
FIG. 3 is a simplistic sketch illustrating a concept behind a process executed by the lane recognizing device of the vehicle environment recognizing apparatus.

The main features of the lane recognizing device 22 will now be explained in more detail. FIG. 2 is a block diagram showing constituent features of the lane recognizing device 22. FIG. 2 also shows other functional components related to the lane recognizing device 22. FIG. 3 is a simplistic sketch illustrating a concept behind a process executed by the lane recognizing device 22. As shown in FIG. 2, the lane recognizing device 22 includes a camera 100, a white line candidate point detecting section 200, a lane recognition processing section 300 and an optical axis revising section 400.

The camera 100 is a digital camera equipped with a CCD (charged coupled device), a CMOS (complementary metal oxide semiconductor), or other type of image capturing element. The camera 100 is one example of an image capturing device that is configured to capture an image of a road on which the vehicle 1 is traveling. The camera 100 captures an image of a region in front of the vehicle 1 and sends the captured image data to the white line candidate point detecting section 200. The camera 100 is installed, for example, in a frontward middle portion of a ceiling inside a cabin of the vehicle 1 and, thus, captures an image of the road in front of the vehicle 1 through the windshield glass. In this way, the camera 100 photographs a region in front of the vehicle 1. It is also acceptable to install the camera 100 in a different arrangement than this arrangement so long as the camera 100 captures an image of the road on which the vehicle 1 travels. For example, a camera can be mounted to a rearward portion of the vehicle in the manner of a back view camera or on a front bumper or other front end portion of the vehicle. The camera can also be mounted in a place where a vanishing point is not captured in the field of view of the camera. In any case, an imaginary vanishing point can be calculated by detecting a white line edge and calculating an approximation line.

The white line candidate point detecting section 200 detects candidate points of a white line that serves as a lane demarcation line based on image data captured by the camera 100. As shown in FIG. 3, the white line candidate point detecting section 200 acquires an image of a road on which the vehicle 1 travels that was captured by the camera 100 and detects a white line edge Ed by executing image processing. In the image processing executed in this embodiment, a position of an image processing frame F is set with respect to lane demarcation lines (white lines) positioned on a left and right of the acquired image. The image processing frame F is based on road parameters that will be explained later (e.g., a road shape and an overall vehicle orientation with respect to the road). Next, a first-order space derivative is applied to the set image processing frame F using, for example, a Sobel filter to emphasize the edges at the boundaries between the white lines and the road surface and to extract the white line edges Ed.

The lane recognition processing section 300 includes a road shape calculating section 310 and a road parameter estimating section 320. The road shape calculating section 310 is configured to calculate a straight line approximation of a road shape. The road parameter estimating section 320 is configured to estimate a road shape and an overall vehicle orientation with respect to the road. As shown in FIG. 3, the road shape calculating section 310 calculates a pair of road shape approximation lines Rf based on pixels of the white line edges Ed extracted by the white line candidate point detecting section 200 that have a brightness equal to or larger than a set threshold value. More specifically, the road shape calculating section 310 determines a line joining at least a set number Pth of the pixels as well as one point lying on a top boundary line and one point lying on a bottom boundary line of a detection region. The straight line corresponding to each white line is then extracted using a Hough transformation to obtain a road shape approximation line Rf. In this embodiment, the captured image data of the road is divided into at least two regions (e.g., a far region and a near region) by the road shape calculating section 310 and a straight line approximation of the road shape is made with respect to each of the two regions by the road shape calculating section 310 (see FIG. 4). A vertical image width of the far region is smaller than a vertical image width of the near region. The road parameter estimating section 320 uses the equation (1) below as a road model equation to estimate a road parameter (a road shape and an overall vehicle orientation or attitude with respect to the road) based on the road shape approximation line Rf detected by the road shape calculating section 310.

$$x = \left(\frac{A - \frac{W}{2}}{H}\right)(y + f \cdot D) - \frac{B \cdot H \cdot f^2}{(y + f \cdot D)} - C \cdot f + jW(y + f \cdot D) \quad (1)$$

The in the equation (1) above, the parameters A, B, C, D and H are vehicle state quantities and road parameters estimated by the road parameter estimating section 320. Specifically, the parameters are a lateral displacement (A) of the vehicle with respect to a lane, and a road curvature (B), a yaw angle (C) of the vehicle with respect to the lane, a pitch angle (D) of the vehicle, a height (H) of a camera 100 from a road surface. Additionally, a constant W indicates a lane width (distance between the left and right white lines on the actual road). A constant f is a camera perspective conversion constant. A parameter j is a parameter for distinguishing between left and right white lines. The parameter j is 0 (j=0) for a left white line and 1 (j=1) for a right white line. The parameters x and y specify coordinates of a point (x, y) on an inside edge of a left or right white line in a coordinate system whose origin is positioned at the upper left of the road image. A rightward direction corresponds to the positive x-axis direction of the coordinate system and a downward direction corresponds to a positive y-axis direction.

The optical axis revising section 400 includes a straight road determining section 410, a parallel travel determining section 420, an imaginary vanishing point calculating section 430 and an optical axis direction revision processing section 440. The straight road determining section 410 is configured to determine if a road on which the vehicle 1 is traveling is a straight (linear) road. The parallel travel determining section 420 is configured to determine if the vehicle 1 is parallel to a road on which the vehicle is traveling. The imaginary vanishing point calculating section 430 is configured to calculate an imaginary vanishing point based on the road shape approximation line Rf. The optical axis direction revision processing section 440 is configured to estimate an optical axis direction based on the imaginary vanishing point, and configured to revise a preset optical axis value stored in the lane recognizing device 22 (e.g. camera 100). The straight road determining section 410 calculates a degree to which the road shape approximation line Rf calculated by the road shape calculating section 310 in the far detection region matches the road shape approximation line Rf calculated in the near detection region and determines if the road on which the vehicle 1 is traveling is a straight road by comparing the calculated matching degree to a prescribed value.

The parallel travel determining section 420 determines if the vehicle 1 is traveling parallel to the road on which the vehicle 1 is traveling based on the attitude of the vehicle with respect to the road estimated by the road parameter estimating section 320. More specifically, the parallel travel determining section 420 uses one of the vehicle state quantities estimated by the road parameter estimating section 320, i.e., the lateral displacement A of the vehicle 1 with respect to the lane, to calculate a lateral velocity of the vehicle 1 with respect to the lane based on a difference between a current value and a past value of the lateral displacement A (i.e., a derivative value of the lateral displacement A). If the lateral velocity is equal to or smaller than a set prescribed value, then the parallel travel determining section 420 determines that the vehicle 1 is traveling parallel to the road. The imaginary vanishing point calculating section 430 calculates an intersection point of the left and right road shape approximation lines Rf as an imaginary vanishing point if the straight road determining section 410 determines that the road on which the vehicle 1 is traveling is straight and the parallel travel determining section 420 determines that the vehicle 1 is parallel to the road on which it is traveling.

The optical axis direction revision processing section 440 calculates an optical axis direction based on the imaginary vanishing point calculated by the imaginary vanishing point calculating section 430 and determines a deviation of the optical path direction by comparing to an optical path direction stored in the lane recognizing device 22. When the determination is made, the optical direction revision processing section 440 uses a past history to estimate an optical axis direction and revises the previous preset value of the optical axis direction stored in the lane recognizing device 22. More specifically, the optical axis direction revision processing section 440 calculates a difference or deviation between the preset value of the optical axis direction stored in the lane recognizing device 22 and the optical axis direction calculated based on the imaginary vanishing point and integrates the difference each time the control loop is executed. This is done for both a yaw direction and a pitch direction.

When the number of times the imaginary vanishing point has been calculated reaches a set value, if the integral value (absolute value) of the difference value for the yaw direction or the pitch direction exceeds a threshold value, then the optical axis direction processing section 440 revises the optical axis by changing the set optical axis direction stored in the lane recognizing device 22 to optical axis direction values estimated based on past history (e.g., average values of optical axis directions estimated within a prescribed number of cycle times in the immediate past). In this way, the variation of the detection results for the optical axis direction can be absorbed and inaccurate revisions of the optical axis direction can be prevented.

The optical axis direction revising processing section 440 determines if the integration value of the difference in the yaw direction and the integration value of the difference in the pitch direction exceed respective threshold values and executes revisions of the optical axis direction independently in the yaw direction and the pitch direction. As a result, the optical axis direction can be revised while distinguishing between an error of a yaw direction component and an error of a pitch direction component of the optical axis direction and a more highly accurate revision of the optical axis direction can be accomplished. When the number of calculations reaches a set value, the optical axis direction revision processing section 440 resets the integration values of the differences of the optical axis direction and resets a count value indicating the number of calculations. The lane recognizing device 22 determines executes a lane recognition process and a straight road determination with respect to each of the near region and the far region in front of the vehicle 1.

Figure 4:
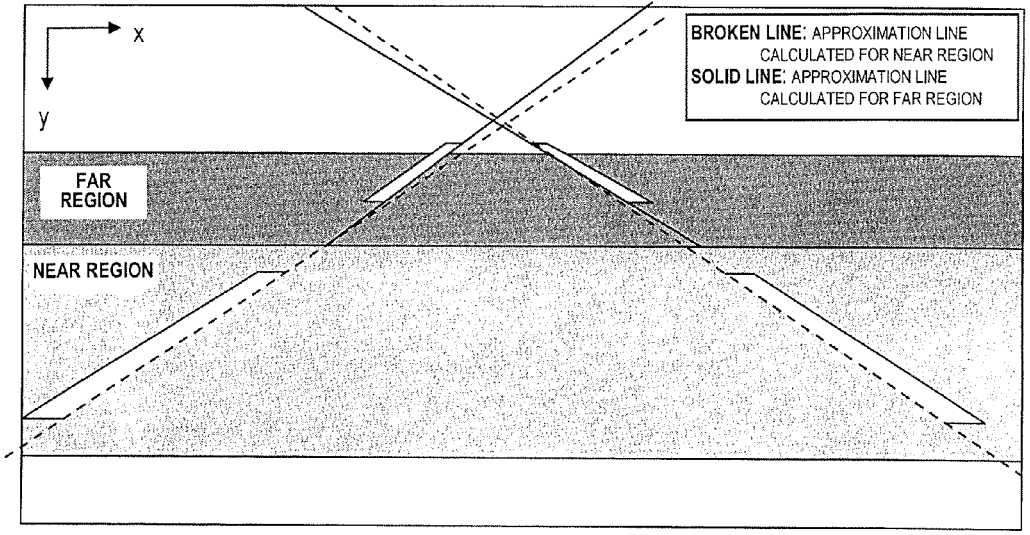
FIG. 4 is a simplistic sketch illustrating a concept employed when a lane recognition process is executed in which a road image is divided into a near region and a far region.

FIG. 4 is a simplistic sketch illustrating a concept employed when a lane recognition process is executed in which a road image is divided into a near region and a far region. In particular, FIG. 4 illustrates an example in which the road curves with a comparatively large radius. As shown in FIG. 4, the lane recognizing device 22 divides the image data captured by the camera 100 into a near region (lower portion of image) and a far region (middle portion of image). The white line candidate point detection section 200 and the lane recognition processing section 300 detect the white line edges Ed and the approximation lines Rf in each of the two regions. The straight road determining section 410 then determines if the road is linear (straight) based on a degree to which the two regions match each other. More specifically, the straight road determining section 410 calculates a degree to which the approximation lines of the near region match the approximation lines of the far region and determines if the road is linear (straight) based on the matching degree. First to third examples of straight line determinations will now be explained.

FIRST EXAMPLE

Straight Line Determination Processing

Figure 5:
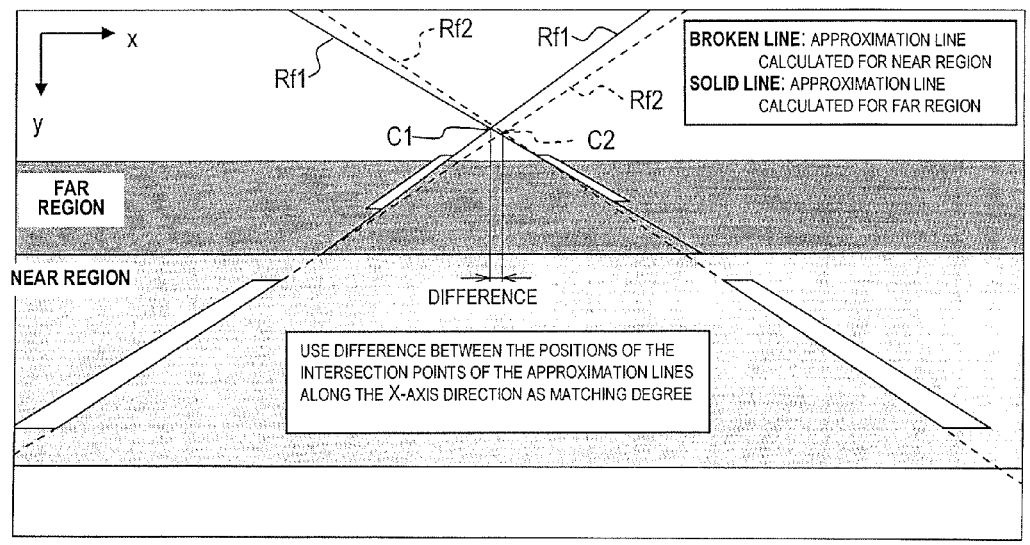
FIG. 5 is a simplistic sketch illustrating a first example of a straight road determination process executed by a straight road determining section.

As shown in FIG. 5, in the first example, the straight road determining section 410 finds an intersection point C1 where two approximation lines Rf1 corresponding to the left and right white line edges detected based on the image of the far region intersect in the image and an intersection point C2 where two approximation lines Rf2 corresponding to the left and right white line edges detected based on the image of the near region intersect on a screen. The straight road determining section 410 then calculates a difference between the positions of the intersection points C1 and C2 along the X-axis direction as a value indicating a degree to which the approximation lines Rf1 of the far region and the approximation lines Rf2 of the near region match. Additionally, the straight road determining section 410 compares this difference (matching degree) to a set difference threshold value. If the calculated difference is equal to or smaller than the set difference threshold value, then the straight road determining section 410 determines that the approximation lines of the far region match the approximation lines of the near region and the road is linear (straight). The difference threshold value is a value for which it is acceptable to assume the road is straight. The difference threshold value is determined in advance experimentally or theoretically based on physical design factors.

SECOND EXAMPLE

Straight Line Determination Processing

Figure 6:
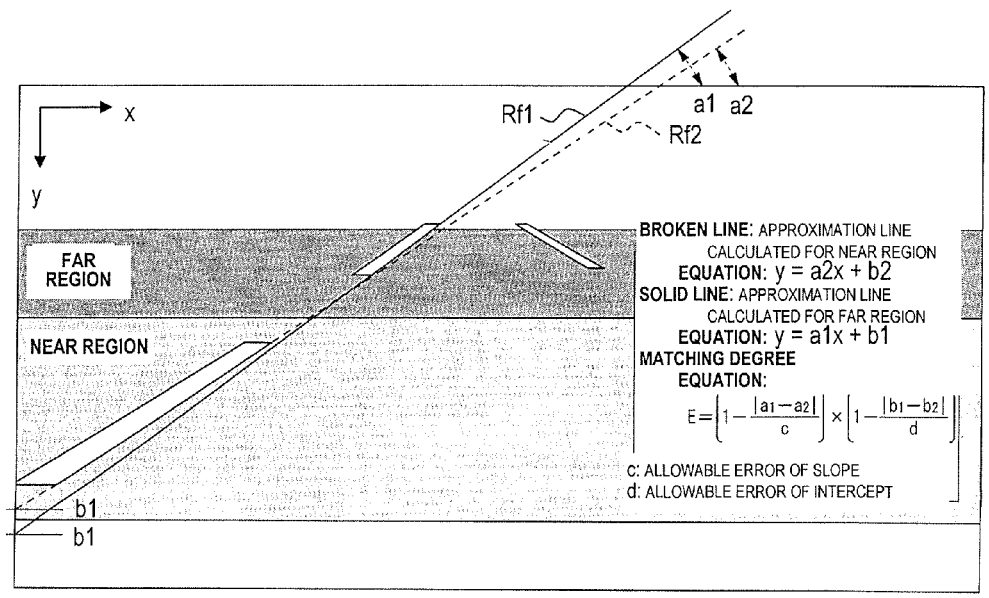
FIG. 6 is a simplistic sketch illustrating a second example of a straight road determination process executed by a straight road determining section.

As shown in FIG. 6, in the second example, the straight road determining section 410 converts one of the approximation lines Rf1 corresponding to the left or the right white line edge detected based on the image of the far region and one of the approximation lines Rf2 corresponding to the left or the right white line edge detected based on the image of the near region into approximation line equations having the form shown in the equations (2) and (3) below.

$$y = a1x + b1 \qquad (2)$$

$$y = a2x + b2 \qquad (3)$$

Based on the equations (2) and (3), the straight road determining section 410 calculates a matching degree E of the two approximation line equations using the equation (4) shown below.

$$E=\{1-[(|a1-a2|)/c]\}\times\{1-[(|b1-b2|)/d]\} \quad (4)$$

In the equation (4), the divisor c is an allowable error of the slope and the divisor d is an allowable error of the intercept.

This processing is executed with respect to the approximation lines of both the left and the right sides. In other words, the approximation lines Rf1 of the far region are expressed in terms of a slope a1 and a y-intercept b1 according to the linear equation (2) and the approximation lines Rf2 of the near region are expressed in terms of a slope a2 and a y-intercept b2 according to the linear equation (3).

Then, a matching degree E of the two approximation lines Rf1 and Rf2 is calculated for each of the left and right sides using the equation (4) based on a difference between the slope a1 and the slope a2 and a difference between the y-intercept b1 and the y-intercept b2. Thus, a matching degree E is calculated for the approximation line Rf1 on the left side of the far region and the approximation line Rf2 on the left side of the near region, and a matching degree E is calculated for the approximation line Rf1 on the right side of the far region and the approximation line Rf2 on the right side of the near region.

The two calculated matching degrees E are compared to two preset determination threshold values, respectively. If each of the matching degrees E is equal to or larger than the respective determination threshold value, then the approximation lines Rf1 of the far region and the approximation lines Rf2 of the near region are determined to match and the road is determined to be straight. It is also acceptable to calculate a product value or a sum total value of the two matching degrees and compare the calculated value to a preset determination threshold value. In such a case, the approximation lines Rf1 and Rf2 of the far and near regions are determined to match one another if the calculated value is equal to or larger than the determination threshold value.

Although in the second example both the slope and the y-intercept of the approximation lines are used to calculate the matching degrees E, it is also acceptable to calculate matching degrees based on the slope and the y-intercept separately. Also, in the second example, the straight road determination is made based on two matching degrees E, i.e., the matching degree E calculated with respect to the left side approximation lines Rf1 and Rf2 and the matching degree E calculated with respect to the right side approximation lines Rf1 and Rf2, in order to accurately determine if the road is straight. If it is not necessary to determine if the road is straight with a high degree of accuracy, then it is acceptable to use only one of the two matching degrees E for the determination. Each of the aforementioned determination threshold values is a value for which it is acceptable to assume the road is straight and is determined in advance experimentally or theoretically based on physical design factors.

THIRD EXAMPLE

Straight Line Determination Processing

Figure 7:
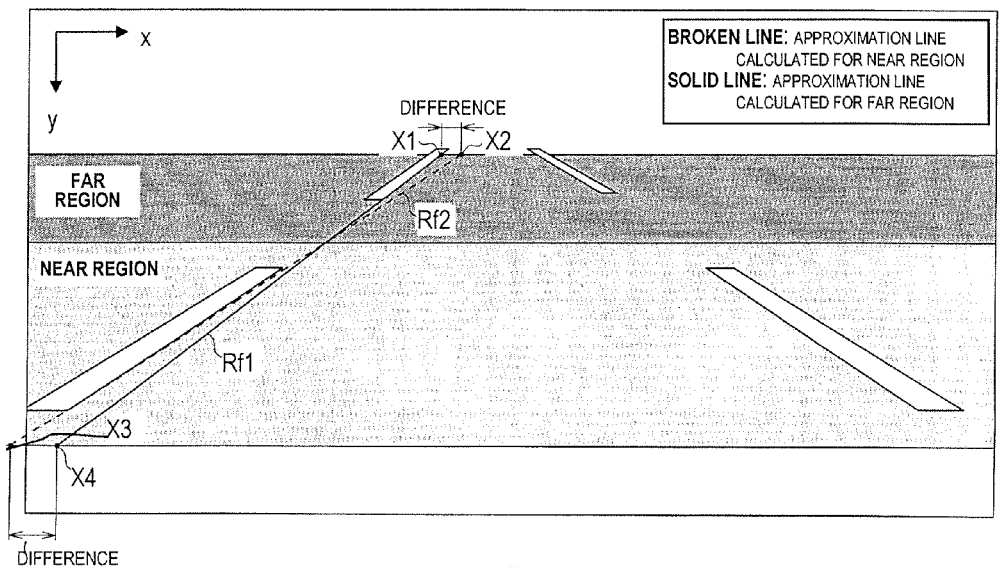
FIG. 7 is a simplistic sketch illustrating a third example of a straight road determination process executed by a straight road determining section.

In a third example, as shown in FIG. 7, the road shape calculating section 310 calculates the approximation lines Rf1 corresponding to the left or the right white line edge detected based on the image of the far region and one of the approximation lines Rf2 corresponding to the left or the right white line edge detected based on the image of the near region. The straight road determining section 410 then finds X coordinates X1 and X2 indicating where the two lines Rf1 and Rf2 intersect a top boundary line of the far region and X coordinates X3 and X4 indicating where the two lines Rf1 and Rf2 intersect a bottom boundary line of the near region. Next, the straight road determining section 410 calculates a difference between the X coordinates of the intersection points on the top boundary line (i.e., a difference between the coordinates X1 and X2) and a difference between the X coordinates of the intersection points on the bottom boundary line (i.e., a difference between the coordinates X3 and X4) to be used as matching degrees E.

The two calculated matching degrees E are compared to two preset determination threshold values, respectively. If each of the matching degrees E is equal to or smaller than the respective threshold value, then the approximation lines Rf1 of the far region and the approximation lines Rf2 of the near region are determined to match and the road is determined to be straight. It is also acceptable to calculate a product value or a sum total value of the two matching degrees and compare the calculated value to a predetermined threshold value. In such a case, the approximation lines Rf1 and Rf2 of the far and near regions are determined to match one another if the calculated value is equal to or smaller than the threshold value.

Although in the third example the matching degrees of the approximation lines are calculated based on the X coordinates of the intersection points of the approximation lines with respect to the upper boundary line of the far region and the lower boundary line of the near region, it is also acceptable to calculate the matching degrees of the approximation lines based on the X coordinates of intersection points between the approximation lines and the top and bottom boundary lines of the entire image processing region (i.e., a screen region). Also, in the third example, the determination as to whether the road is straight is based on a difference calculated with respect to the approximation lines Rf1 and Rf2 on the left side. However, in order to increase the accuracy of the determination process, it is acceptable to calculate a difference with respect to the approximation lines Rf1 and Rf2 on the right side and include that difference in the straight road determination process. Each of the aforementioned determination threshold values is a value for which it is acceptable to assume the road is straight and is determined in advance experimentally or theoretically based on physical design factors.

Figure 8:
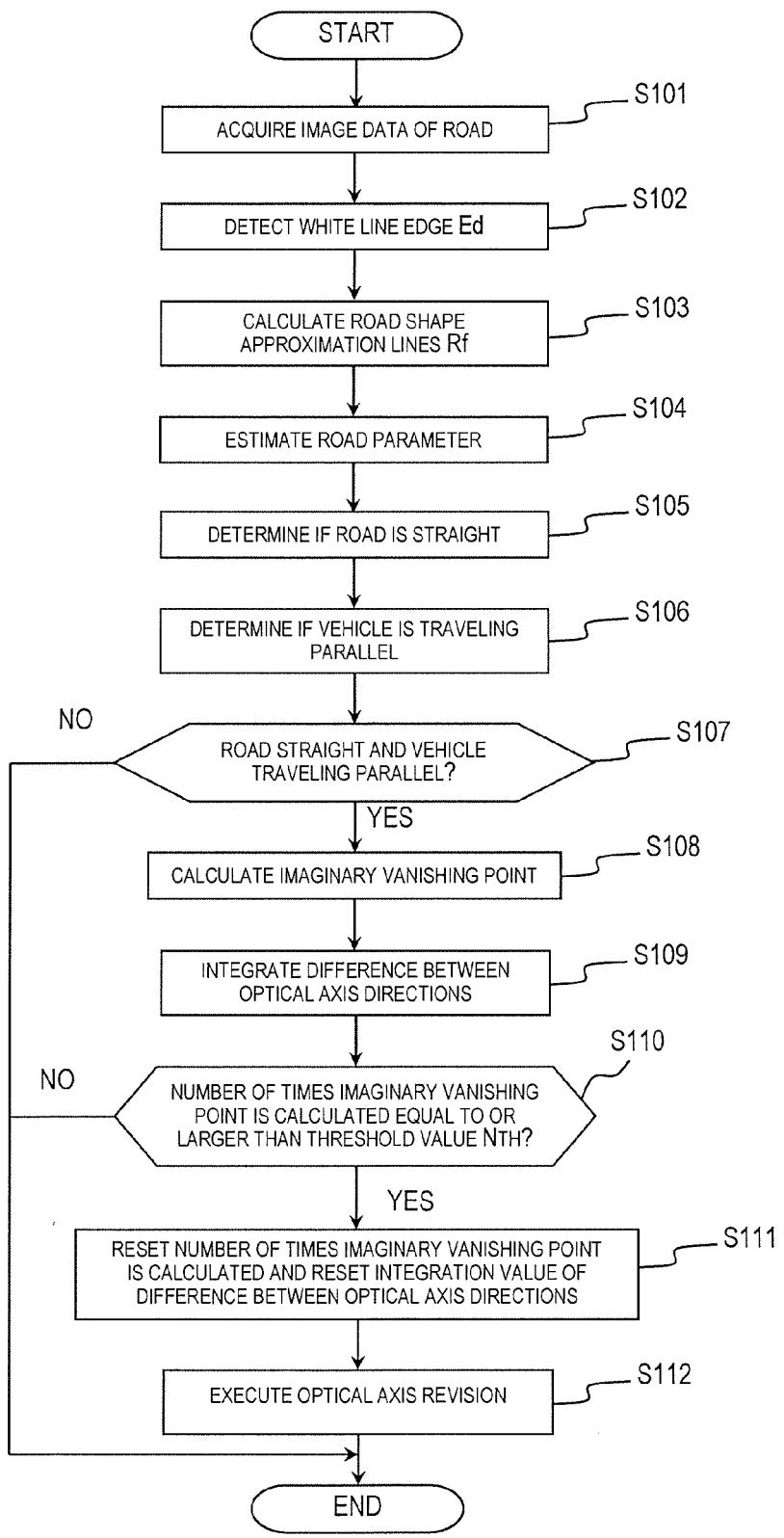
FIG. 8 is a flowchart showing the processing steps of an optical axis revision process executed by the lane recognizing device.

The optical axis revision process executed by the lane recognizing device 22 will now be explained. FIG. 8 is a flowchart showing an optical axis revision process executed by the lane recognizing device 22. The optical axis revision process is executed in order to position an optical axis of the camera 100 accurately and achieve an accurate lane recognition process. The lane recognizing device 22 executes the optical axis revision process shown in FIG. 8 repeatedly while the camera 100 is repeatedly capturing images. As shown in FIG. 8, when the optical axis revision process is started, the lane recognizing device 22 acquires image data of a road or lane on which the vehicle 1 is traveling from the camera 100 (step S101).

The white line candidate point detecting section 200 of the lane recognizing device 22 then executes image processing with respect to the road image data to detect a white line edge Ed (step S102). The road shape calculating section 310 of the lane recognizing device 22 then uses the detected white line edge Ed to acquire a road or lane shape approximation line Rf in each of a far region and a near region (step S103). More specifically, the road shape calculating section 310 acquires an approximation line Rf with respect to each of a left white line and a right white line of the road or lane. Next, the road parameter estimating section 320 of the lane recognizing device 22 estimates a road or lane parameter by using the road shape approximation lines Rf in the equation (1).

Next, the straight road determining section 410 of the lane recognizing device 22 determines if the road on which the vehicle is straight based on the road shape approximation lines Rf (step S105). The parallel travel determining section 420 of the lane recognizing device 22 determines if the vehicle is traveling parallel to the road based on the estimated road parameter (step S106). Based on the results of steps S105 and S106, the lane recognizing device 22 determines if the road or lane on which the vehicle 1 is traveling is straight and the vehicle 1 is traveling parallel to the road or lane (step S107).

If the results of steps S105 and S106 are such that the road or lane on which the vehicle 1 is traveling is straight and the vehicle 1 is traveling parallel to the road or lane, then the imaginary vanishing point calculating section 430 of the lane recognizing device 22 calculates an imaginary vanishing point based on the left and right approximation lines Rf (step S108). If the results of steps S105 and S106 are such that the road or lane on which the vehicle 1 is traveling is not straight and/or the vehicle 1 is not traveling parallel to the road or lane, then the lane recognizing device 22 returns to step S101.

In step S108, the optical axis revision processing section 440 of the lane recognizing device 22 integrates a difference between an optical axis direction that can be calculated based on the imaginary vanishing point and an optical axis direction currently stored in the lane recognizing device 22 (step S109). Next, the lane recognizing device 22 determines if a number of times the imaginary vanishing point has been calculated has reached or exceeded a set value Nth (step S110). If it determines that the number of times the imaginary vanishing point has been calculated (i.e., the number of times the difference between the optical axis direction has been integrated) is equal to or larger than Nth, the lane recognizing device 22 resets a count value indicating the number of calculations of the imaginary vanishing point and resets the integration value of the difference between the optical axis directions (step S111).

The optical axis revision processing section 440 also revises the optical axis (step S112) and, lastly, the lane recognizing device 22 returns to step S101. If the lane recognizing device 22 determines in step S110 that the number of times the imaginary vanishing point has been calculated is smaller than the set value, then the lane recognizing device 22 returns to step S101. With the control processing explained above, the apparatus can detect a degree of curvature of a road in a precise manner by determining a straightness degree of the road or lane based on a degree to which an approximation line Rf in a far region of a road image match an approximation line Rf in a near region of the road image. As a result, the apparatus can calculate an imaginary vanishing point more accurately and revise the optical axis of the camera 100 more precisely.

The operation will now be explained. When the ignition of the vehicle 1 is turned on, the lane recognizing device 22 photographs an image of the road in front of the vehicle and starts executing the lane departure avoidance process. While the camera 100 is photographing images of a road or lane, the lane recognizing device 22 executes an optical axis revision process to revise the optical axis of the camera 100 to a proper state. That is, the lane recognizing device 22 detects the white line candidate points Ed in a road image data captured by the camera 100 and calculates a road shape approximation line Rf. The lane recognizing device 22 then estimates a road parameter using the equation (1) and determines if a road on which the vehicle is traveling is straight and if the vehicle is traveling parallel to the road.

If the road is straight and the vehicle is traveling parallel to the road, then the lane recognizing device 22 calculates an imaginary vanishing point and integrates a difference between an optical axis direction indicated by the calculated imaginary vanishing point and a currently stored optical axis direction. When a number of times the imaginary vanishing point has been calculated (a count value) is determined to be equal to or larger than a preset value, the lane recognizing device 22 resets the integration value of the difference between the optical axis directions, resets the count value indicating the number of times the imaginary vanishing point has been calculated, and revises the optical axis direction to the values of an optical axis direction estimated based on past history. In this way, the optical axis of the camera 100 can be set to a proper state and the lane recognizing device 22 can accomplish a more precise lane recognition process. As a result, the lane departure avoidance can be accomplished more appropriately.

As explained above, in the vehicle 1 according to the illustrated embodiment, the lane recognizing device 22 determines if a road on which the vehicle 1 is traveling is straight based on a degree to which an approximation line Rf calculated with respect to a far region in front of the vehicle matches an approximation line Rf calculated with respect to a near region in front of the vehicle. Thus, a degree of curvature of a road can be detected in a more precise manner and an imaginary vanishing point can be calculated more accurately. As a result, an optical axis revision can be executed under conditions that are appropriate for an optical axis revision and a more accurate optical axis revision can be achieved in the vehicle environment recognizing apparatus 1A.

Although in the first embodiment the vehicle environment recognizing apparatus 1A is configured to detect white lines provided on both sides of a road, it is acceptable to detect a lane marker, a road stud, a media strip, or any other feature that is provided in a continuous fashion along a road so as to demarcate a lane of the road and can be used to detect the road. Also, in the first embodiment, the camera 100 corresponds to an image capturing device or means and the white line candidate point detecting section 200 and the road shape calculating section 310 correspond to a road shape calculating component or means. The straight road determining section 410 corresponds to a straight road determining component or means and the parallel travel determining section 420 corresponds to a parallel travel determining component or means. The imaginary vanishing point calculating section 430 corresponds to an imaginary vanishing point calculating component or means and the optical axis direction revision processing section 440 corresponds to an optical axis direction revising component or means.

The vehicle environment recognizing apparatus 1A calculates road shape approximation lines for the road in a plurality of regions in front of the vehicle, e.g., a far region and a near region, and calculates an imaginary vanishing point when the road is straight and the vehicle is traveling parallel to the road. The vehicle environment recognizing apparatus 1A then estimates an optical axis direction based on the calculated imaginary vanishing point and revises the optical axis direction. The precision of the straight road determination is improved because the determination as to whether or not a road on which the vehicle is traveling in straight is made based on straight lines that approximate the road shape in a plurality of regions. Also, the optical axis direction can be estimated more accurately because the imaginary vanishing point is calculated when the vehicle is traveling parallel to a road that has been determined to be straight as explained above. As a result, the optical axis of a vehicle environment recognizing apparatus can be revised more accurately.

The vehicle environment recognizing apparatus 1A photographs an image in front of or in rear of the vehicle and executes image processing to detect the road on which the vehicle is traveling based on features provided on the road or on a side of the road. Thus, even if a camera photographing a surrounding area of the vehicle is used as a vehicle environment recognizing apparatus, the optical axis of the vehicle environment recognizing apparatus can be revised more accurately.

The vehicle environment recognizing apparatus 1A calculates a road shape of the road on which the vehicle is traveling based on a feature that is provided continuously along the road and serves to demarcate the road or a lane. As a result, the optical axis direction can be revised using various types of road features.

The vehicle environment recognizing apparatus 1A divides a road on which the vehicle is traveling into left and right regions centered on the vehicle and calculates approximation lines expressing a road shape in a plurality of regions within each of the left and right regions. The vehicle environment recognizing apparatus 1A then determines if the road on which the vehicle is traveling is straight by determining a degree to which the approximation lines of the respective regions on the left side match one another and a degree to which the approximation lines of the respective regions on the right side match one another. Thus, by calculating an approximation line in a far region and an approximation line in a near region in each of the left and right regions, the optical axis direction can be revised with a higher degree of precision.

The vehicle environment recognizing apparatus 1A integrates a difference between a stored optical axis direction and an optical axis direction estimated based on a calculated imaginary vanishing point. When the number of times the imaginary vanishing point has been calculated reaches a set number, the vehicle environment recognizing apparatus 1A revises the optical axis direction if the absolute value of the integration result is equal to or larger than a set threshold value. In this way, the variation of the estimation result for the optical axis direction can be absorbed and inaccurate revisions of the optical axis direction can be prevented.

When the vehicle environment recognizing apparatus 1A integrates a difference between a stored optical axis direction and an optical axis direction estimated based on a calculated imaginary vanishing point, separate differences are calculated for a yaw direction component and a pitch direction component of the optical axis direction and separate integration values are calculated for each of the component directions. The optical axis is then revised in each of the yaw direction and the pitch direction independently. As a result, the optical axis direction can be revised while distinguishing between an error of a yaw direction component and an error of a pitch direction component of the optical axis direction and a more highly accurate revision of the optical axis direction can be accomplished.

A second embodiment of the vehicle environment recognizing apparatus 1A will now be explained. In this embodiment, the method of determining if a road is straight is slightly different from the lane recognizing device 22 of the first embodiment. More specifically, in addition to a straight road determination and a parallel travel determination accomplished using the camera 100, this second embodiment uses the vehicle sensors (e.g., yaw rate sensor and acceleration sensor) used in the lane departure avoidance executed in the first embodiment to execute a straight road determination based on a yaw rate and a lateral acceleration.

Figure 9:
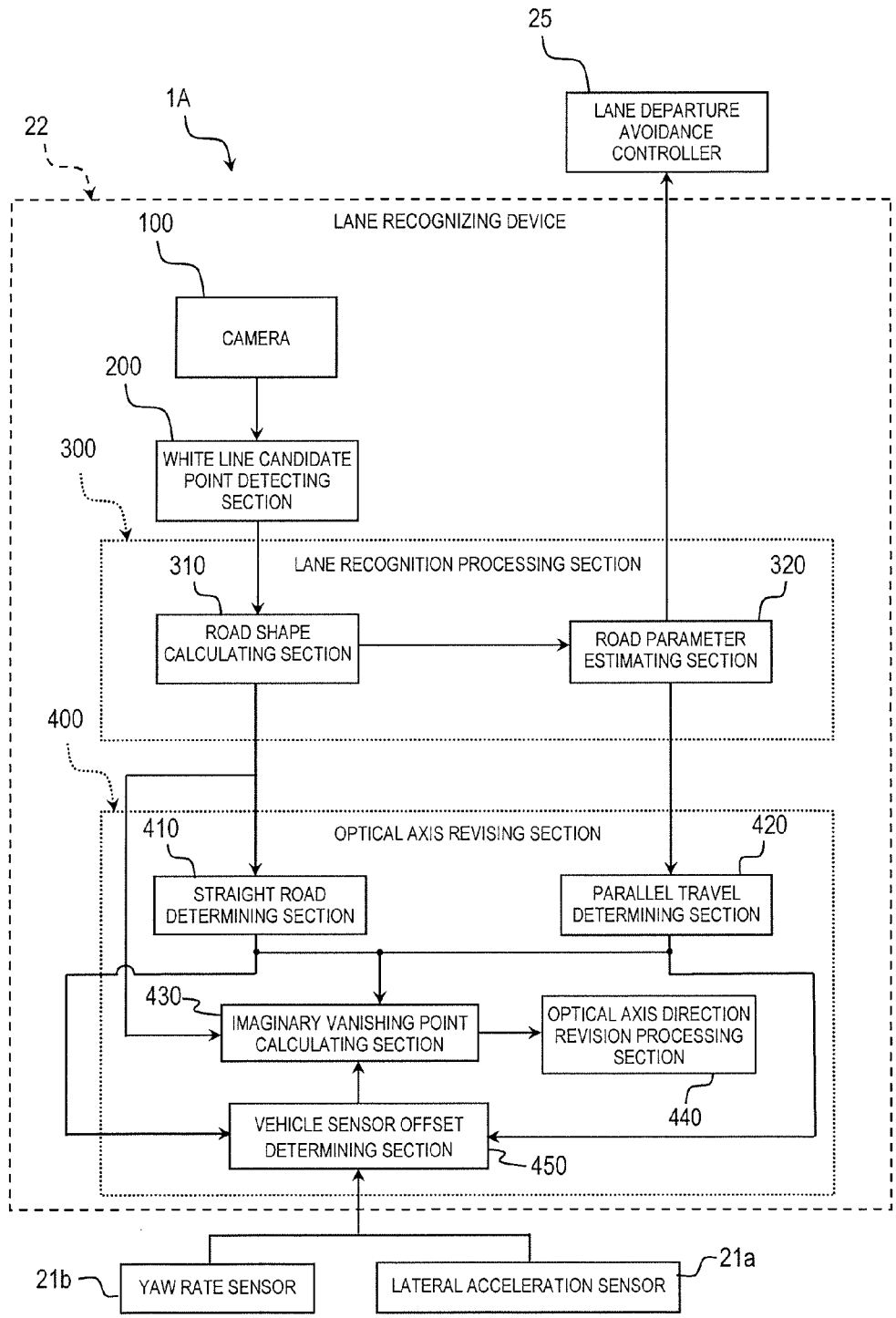
FIG. 9 is a block diagram showing basic features of a vehicle environment recognizing apparatus according to another illustrated embodiment.

FIG. 9 is a block diagram showing constituent features of a lane recognizing device 22 according to the second embodiment. FIG. 9 also shows other functional components related to the lane recognizing device 22. A lateral acceleration sensor 21a and a yaw rate sensor 21b constitute a portion of a vehicle state parameter acquiring section or component 21. As shown in FIG. 9, the lane departure avoidance controller 25 controls a buzzer 28 and a steering mechanism so as to execute a steering assistance by using a road parameter estimated by a lane recognizing device 22 and vehicle state detection values (vehicle speed, yaw rate, and lateral acceleration) obtained from the wheel speed sensors 24FR, 24FL, 24RR and 24RL, the lateral acceleration sensor 21a and a yaw rate sensor 21b.

The lane recognizing device 22 shown in FIG. 9 is basically the same as the lane recognizing device 22 of the first embodiment, except that it also includes a vehicle sensor offset determining section or component 450. The outputs of the lateral acceleration sensor 21a and the yaw rate sensor 21b are fed to the imaginary vanishing point calculating section 430 through the vehicle sensor offset determining section 450. The determination results of the straight road determining section 410 and the parallel travel determining section 420 are also fed to the vehicle sensor offset determining section 450.

The vehicle sensor offset determining section 450 is configured to determine if a median value of the yaw rate and the lateral acceleration is in a vicinity of 0 (i.e., within a set value from 0) when a determination result obtained by the straight road 410 indicates that the road on which the vehicle 1 is traveling is straight and a determination result obtained by the parallel travel determining section 420 indicates that the vehicle 1 is traveling parallel to the road. The vehicle sensor offset determining section 450 stores the result of this determination as history for a prescribed number of times and determines if the median value of the yaw rate or the lateral acceleration is offset by comparing a current result to a result stored in the history.

The imaginary vanishing point calculating section 430 only calculates an intersection point of left and right road shape approximation lines Rf to be used as an imaginary vanishing point when the following conditions have been satisfied: (1) the vehicle sensor offset determining section 450 has determined that the yaw rate or the lateral acceleration is not offset; (2) the straight road determining section 410 has determined that the road on which the vehicle 1 is traveling is straight; (3) the parallel travel determining section 420 has determined that the vehicle 1 is traveling parallel to the road; and (4) the vehicle sensor value (yaw rate or lateral acceleration) that has been determined not to be offset is within a prescribed value range.

If the vehicle sensor offset determining section 450 has determined that both the yaw rate and the lateral acceleration are offset, then the imaginary vanishing point calculating section 430 uses the determination results of the straight road determining section 410 and the parallel travel determining section 420 and executes the same processing as in the first embodiment. The optical axis revision processing section 440 of this second embodiment differs from the first embodiment in that this second embodiment calculates a reliability degree of the imaginary vanishing point based on a detection circumstance of the white line candidate point detecting section 200 and a determination as to whether or not a vehicle sensor was used in the straight road determination and, based on the reliability degree, varies a number of times that (amount of time during which) the integration value of the previously explained differences between optical axis directions is calculated. As a result, the optical axis direction revising section 440 can revise the optical axis at an earlier time when a state in which the reliability degree is high has continued.

Figure 10:
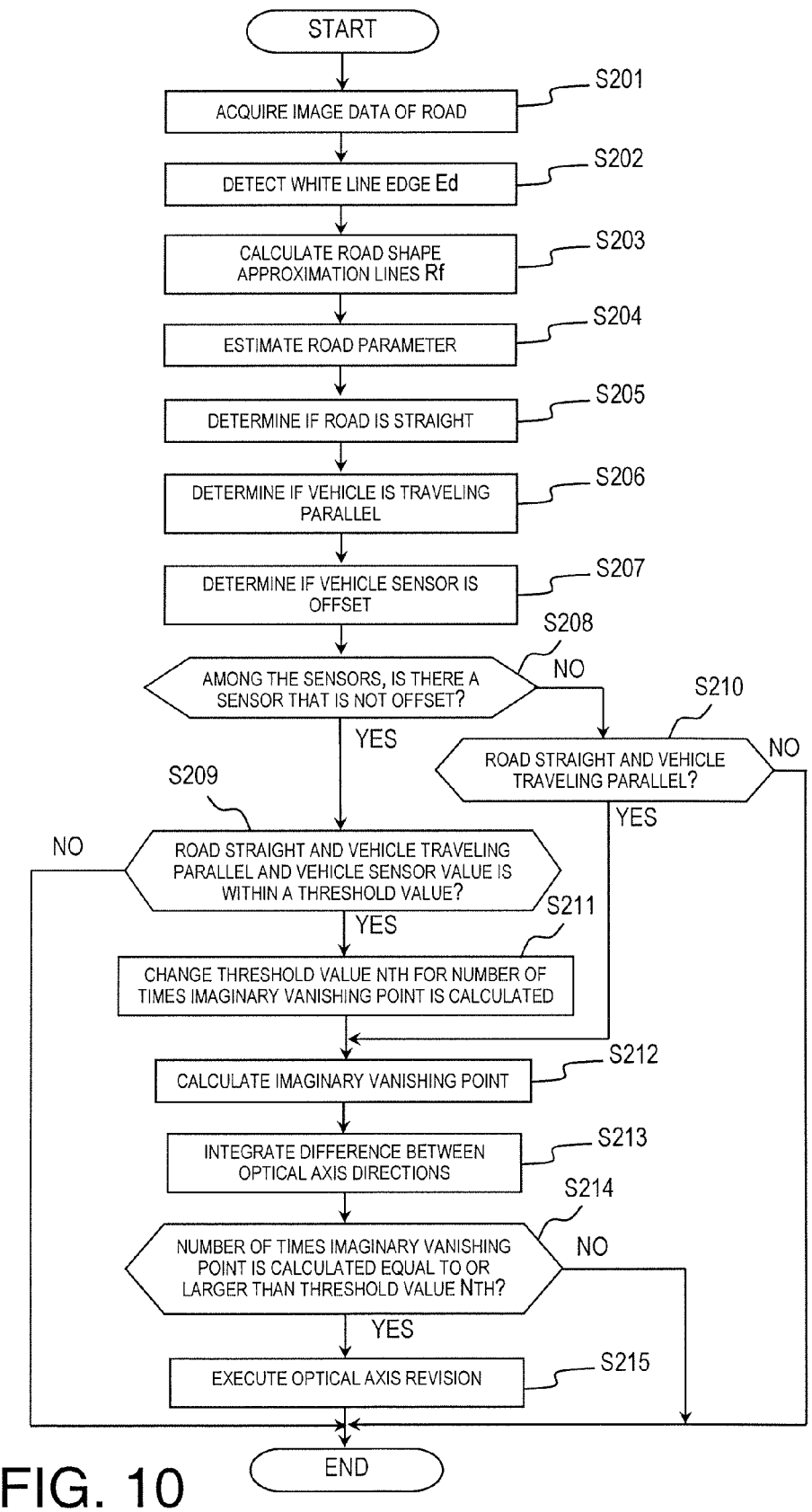
FIG. 10 is a flowchart showing the processing steps of an optical axis revising process according to another illustrated embodiment.

FIG. 10 is a flowchart showing an optical axis revising process according to the second embodiment. The optical axis revision process is executed in order to position an optical axis of the camera 100 accurately and achieve an accurate lane recognition process. The lane recognizing device 22 executes the optical axis revision processing shown in FIG. 8 repeatedly while the camera 100 is capturing an image. In the optical axis revision process shown in FIG. 10, the processing executed in steps S201 to S206 is the same as the optical axis revision processing shown in the steps S101 to S106 of FIG. 8 and, thus, explanations of these steps are omitted for the sake of brevity. Only the portions that are different will be explained. After step S206, the vehicle sensor offset determining section 450 of the lane recognizing device 22 determines if the yaw rate is offset and if the lateral acceleration is offset (step S207). The lane recognizing device 22 then determines if the yaw rate and/or the lateral acceleration is not offset (step S208).

If the lane recognizing device 22 determines in step S208 that at least one of the yaw rate and the lateral acceleration is not offset, then the lane recognizing device 22 determines if the road on which the vehicle 1 is traveling is straight based on the determination result of step S205, the vehicle 1 is traveling parallel to the road based on the determination result of step S206, and the vehicle sensor value determined not to be offset is within a set value (step S209). If the results of steps S105 and S106 are such that the road on which the vehicle 1 is traveling is straight and the vehicle 1 is traveling parallel to the road but the vehicle sensor value determined not to be offset is not within a set value, then the lane recognizing device 22 returns to step S201.

If the lane recognizing device 22 determines in step S208 that both the yaw rate and the lateral acceleration are offset (i.e., neither is not offset), then the lane recognizing device 22 determines if the road on which the vehicle 1 is traveling is straight and the vehicle 1 is traveling parallel to the road based on the determination results of step S205 and step S206 (step S210). After step S209, the optical axis revision processing section 440 of the lane recognizing device 22 calculates a reliability degree of an acquired imaginary vanishing point based on a detection circumstance of the white line candidate point detecting section 200 and a determination as to whether or not a vehicle sensor was used in the straight road determination and, based on the reliability degree, varies a number of times that the integration values of the differences between optical axis directions are calculated (i.e., varies the set value Nth used in step S214). The processing executed in steps S212 to S215 is the same as the optical axis revision processing executed in steps S108 to S111 in FIG. 8.

In step S211 of this embodiment, the optical axis revision processing section 440 calculates a reliability degree of an acquired imaginary vanishing point based on a detection circumstance of the white line candidate point detecting section 200 and a determination as to whether or not a vehicle sensor was used in the straight road determination. More specifically, the optical axis revision processing section 440 determines a reliability degree of a calculated imaginary vanishing point based on a detection circumstance of the white line candidate point detecting section 200 and a determination as to whether or not a vehicle sensor was used in the straight road determination and, based on the determination result, varies a number of times the optical axis error differences are integrated. The variation is configured such that the higher the reliability of the calculated imaginary vanishing point is, the shorter the amount of time (the smaller the number of times) that the optical axis direction errors are calculated becomes.

The detection circumstance of the white line candidate point detecting section 200 is considered to be good, i.e., the reliability of the calculated imaginary vanishing point is considered to be high, when the following two conditions are satisfied: (1) a feature (e.g., a white line edge) of the road on which the vehicle is traveling can be detected to a far distance; and (2) the feature (e.g., a white line edge) of the road on which the vehicle is traveling can be detected in a continuous fashion without variation from near to far. The reliability of the imaginary vanishing point is also higher if a vehicle sensor was used to calculate the imaginary vanishing point than if a vehicle sensor was not used.

Under circumstances in which the road on which the vehicle 1 is traveling is determined to be straight, the vehicle 1 is determined to be traveling parallel to the road, and the value of a vehicle sensor is a median value (in a vicinity of 0), the optical axis direction revision processing section 440 stops the revision of the optical axis direction when the detection value of the vehicle sensor exceeds a set threshold value (i.e., when it is estimated that the road on which the vehicle is traveling is no longer straight). In this way, a straight road can be detected more accurately, the reliability of a calculated imaginary vanishing point can be increased, and the optical axis direction can be revised with a higher degree of precision.

Figure 11:
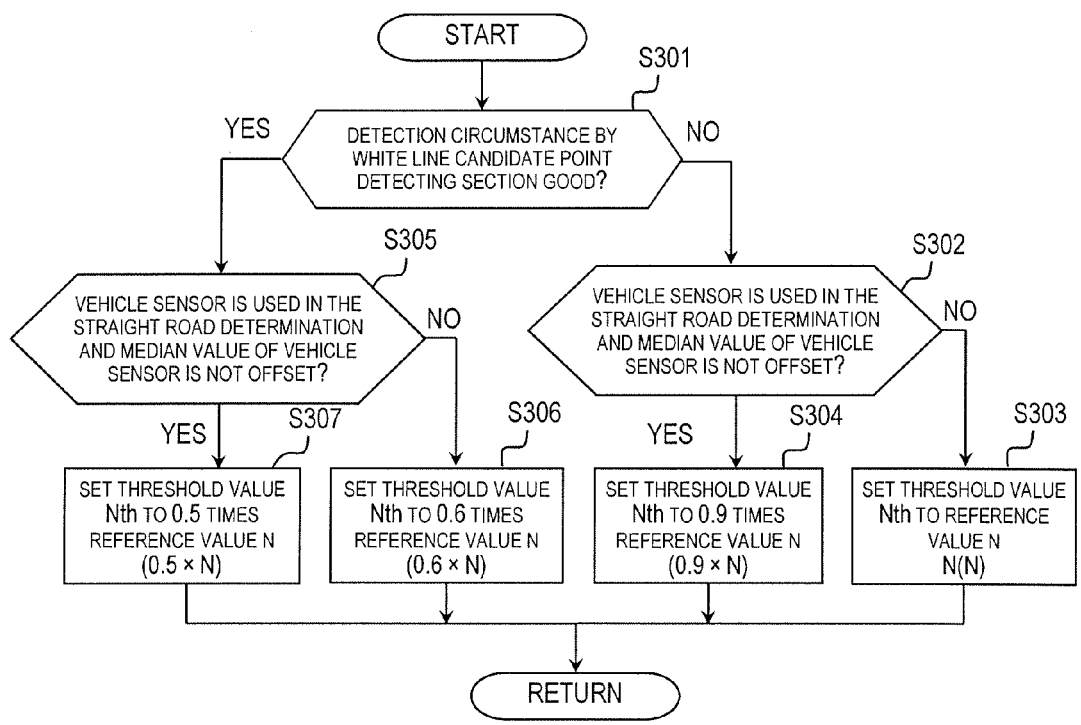
FIG. 11 is a flowchart showing a control process for setting a number of times an integration value of a difference between optical axis directions will be calculated.

In step S211 of the second embodiment, the vehicle environment recognizing apparatus 1A calculates a number of times an integration value of a difference between optical axis directions will be calculated (i.e., calculates a set value Nth indicating a number of times the imaginary vanishing point is to be calculated) in accordance with the reliability degree of the imaginary vanishing point. FIG. 11 is a flowchart showing a control process for setting a number of times an integration value of a difference between optical axis directions will be calculated. The routine shown in FIG. 11 is a subroutine of the step S211 shown in FIG. 10. As shown in FIG. 11, the optical axis direction revision processing section 440 determines if a detection circumstance of the white line candidate point detecting section 200 is good (step S301).

More specifically, the optical direction revision processing section 440 determines that the detection circumstance of the white line candidate point detecting section 200 is good if at least one of the aforementioned conditions (1) and (2) is satisfied, i.e., if a white line edge Ed is detected in a far region and/or if the white line edge Ed is detected in a continuous fashion from the far region to a near region. If it determines in step S301 that the detection circumstance of the white line candidate point detecting section 200 is not good, then the optical axis direction revision processing section 440 determines if a vehicle sensor was used for the straight road determination and the median value of the vehicle sensor is not offset (step S302).

If it determines in step S302 that a vehicle sensor was not used in the straight road determination or that the median value of the vehicle sensor is offset, then the optical axis direction revision processing section 440 sets a preset default value N as the threshold value Nth serving as the number of times (amount of time) that the integration value of the difference between optical axis directions will be calculated (step S303). The default value N is the longest value that can be set as the number of times (amount of time) that the integration value of the difference between optical axis directions will be calculated.

Meanwhile, if it determines in step S302 that a vehicle sensor was used in the straight road determination or that the median value of the vehicle sensor is not offset, then the optical axis direction revision processing section 440 sets a value equal to 0.9 times the default value N (0.9N) as the threshold value Nth serving as the number of times (amount of time) that the integration value of the difference between optical axis directions will be calculated (step S304). If it determines in step S301 that the detection circumstance of the white line candidate point detecting section 200 is good, then the optical axis direction revision processing section 440 determines if a vehicle sensor was used for the straight road determination and the median value of the vehicle sensor is not offset (step S305).

Meanwhile, if it determines in step S305 that a vehicle sensor was not used in the straight road determination or that the median value of the vehicle sensor is offset, then the optical axis direction revision processing section 440 sets a value equal to 0.6 times the default value N (0.6N) as the threshold value Nth serving as the number of times (amount of time) that the integration value of the difference between optical axis directions will be calculated (step S306). Meanwhile, if it determines in step S305 that a vehicle sensor was not used in the straight road determination or that the median value of the vehicle sensor is not offset, then the optical axis direction revision processing section 440 sets a value equal to 0.5 times the default value N (0.5N) as the threshold value Nth serving as the number of times (amount of time) that the integration value of the difference between optical axis directions will be calculated (step S307). The value of 0.5 times the default value N is the shortest value that can be set as the number of times (amount of time) that the integration value of the difference between optical axis directions will be calculated.

With the processing explained above, if a yaw rate sensor, an acceleration sensor, or other vehicle sensor that can determine if the road is straight is installed in the vehicle, then the vehicle sensor is used for the straight road determination after making sure that the vehicle sensor is not offset and the determination result will be reliable. In this way, an incorrect straight road determination resulting from detection error of the white line candidate point detecting section 200 can be avoided and the optical axis can be revised with a higher degree of precision.

The higher the reliability degree of the calculated imaginary vanishing point is, the smaller the number of times (shorter the time) that the integration value of the difference between the optical axis directions is calculated is set to be. After steps S303, S304, S306, and S307, the optical axis direction revision processing section 440 returns to the main routine. In this way, the optical axis direction can be revised with a higher degree of responsiveness when circumstances are such that the reliability degree of the calculated imaginary vanishing point is comparatively high, and an incorrect straight road determination caused by detection error of the white line candidate point detecting section 200 can be avoided when circumstances are such that the reliability degree of the calculated imaginary vanishing point is comparatively low.

The operation will now be explained. When the ignition of the vehicle 1 is turned on, the lane recognizing device 22 photographs an image of the road in front of the vehicle and starts executing the lane departure avoidance process. While the camera 100 is photographing an image of a road, the lane recognizing device 22 executes an optical axis revision process to revise the optical axis of the camera 100 to a proper state. That is, the lane recognizing device 22 detects white line candidate points Ed in a road image data captured by the camera 100 and calculates a road shape approximation line Rf. The lane recognizing device 22 then estimates a road parameter using the equation (1) and determines if a road on which the vehicle 1 is traveling is straight and if the vehicle 1 is traveling parallel to the road.

If the road is straight and the vehicle 1 is traveling parallel to the road, then the lane recognizing device 22 calculates an imaginary vanishing point and integrates a difference between an optical axis direction indicated by the calculated imaginary vanishing point and a currently stored optical axis direction. When a number of times the imaginary vanishing point has been calculated (a count value) is determined to be equal to or larger than a set value, the lane recognizing device 22 resets the integration value of the difference between the optical axis directions, resets the count value indicating the number of times the imaginary vanishing point has been calculated, and revises the optical axis direction to the values of an optical axis direction estimated based on past history. In this way, the optical axis of the camera 100 can be set to a proper state and the lane recognizing device 22 can accomplish a more precise lane recognition process. As a result, the lane departure avoidance can be accomplished more appropriately.

The vehicle 1 calculates a reliability degree of an acquired imaginary vanishing point based on a detection circumstance of the white line candidate point detecting section 200 and a determination as to whether or not a vehicle sensor was used in the straight road determination. Then, based on the reliability degree, the vehicle 1 varies the number of times (set value Nt) that an integral value of a difference between optical axis directions is calculated. In this way, an incorrect straight road determination resulting from detection error of the white line candidate point detecting section 200 can be avoided and the optical axis can be revised with a higher degree of precision. Also, with the vehicle 1, the higher the reliability degree of the calculated imaginary vanishing point is, the smaller the number of times (shorter the time) that the integration value of the difference between the optical axis directions is calculated is set to be. In this way, the optical axis direction can be revised with a higher degree of responsiveness when circumstances are such that the reliability degree of the calculated imaginary vanishing point is comparatively high, and an incorrect straight road determination caused by detection error of the white line candidate point detecting section 200 can be avoided when circumstances are such that the reliability degree of the calculated imaginary vanishing point is comparatively low.

As explained above, in the vehicle 1 according to the embodiment, the lane recognizing device 22 determines if a road on which the vehicle 1 is traveling is straight based on a degree to which an approximation line Rf calculated with respect to a far region in front of the vehicle 1 matches an approximation line Rf calculated with respect to a near region in front of the vehicle 1. Thus, a degree of curvature of a road can be detected in a more precise manner and an imaginary vanishing point can be calculated more accurately. As a result, an optical axis revision can be executed under conditions that are appropriate for an optical axis revision and a more accurate optical axis revision can be achieved in the vehicle environment recognizing apparatus 1A. Also, the vehicle environment recognizing apparatus 1A calculates a reliability degree of a calculated imaginary vanishing point based on a detection circumstance of the white line candidate point detecting section 200 and a detection result of a vehicle sensor and sets a number of times (amount of time) that an integration value of a difference between optical axis directions is calculated to be shorter when the reliability degree is higher.

As a result, an incorrect straight road determination resulting from detection error of the white line candidate point detecting section 200 is avoided and the optical axis can be revised with a higher degree of precision. Additionally, with this embodiment, the optical axis direction can be revised with a higher degree of responsiveness and an incorrect straight road determination caused by detection error of the white line candidate point detecting section 200 can be avoided by adjusting the responsiveness according to the reliability degree of the calculated imaginary vanishing point. In this embodiment, the yaw rate sensor 21b of the vehicle state parameter acquiring section 21 corresponds to a yaw rate measuring means and the lateral acceleration sensor 21a corresponds to a lateral acceleration measuring means.

When the road on which the vehicle 1 is traveling is straight and the vehicle 1 is traveling parallel to the road, the optical axis direction revising section 400 stops revising the optical axis direction if a yaw rate value exceeds a set threshold value. In this way, a straight road can be detected more accurately, the reliability of a calculated imaginary vanishing point can be increased, and the optical axis direction can be revised with a higher degree of precision.

When the road on which the vehicle 1 is traveling is straight and the vehicle 1 is traveling parallel to the road, the optical axis direction revising means stops revising the optical axis direction if a lateral acceleration value exceeds a set threshold value. In this way, a straight road can be detected more accurately, the reliability of a calculated imaginary vanishing point can be increased, and the optical axis direction can be revised with a higher degree of precision.

A reliability degree of the imaginary vanishing point is determined based on a detection circumstance of the lane recognizing processing section 300 and a determination as to whether or not a vehicle sensor was used in a calculation of the imaginary vanishing point. Based on the reliability degree, the apparatus varies a number of times an integration value of a difference between an optical axis direction estimated based on the calculated imaginary vanishing point and an optical axis direction stored in a storage component of the lane recognizing device 22 will be calculated before the integration result is checked to see if it is equal to or larger than a threshold value.

Thus, the optical axis direction can be revised with a higher degree of responsiveness when circumstances are such that the reliability degree of the calculated imaginary vanishing point is comparatively high, and an incorrect straight road determination caused by detection error of the white line candidate point detecting section 200 can be avoided when circumstances are such that the reliability degree of the calculated imaginary vanishing point is comparatively low. Although in the embodiments explained heretofore, the straight road determination is accomplished by dividing (partitioning) an image captured by the camera 100 into a near region and a far region, it is also possible to work the lane recognizing device 22 by dividing a captured image into three or more regions. It is also acceptable if a vertical dimension of the near region of the image is equal to a vertical dimension of a far region of the image. Moreover, it is also acceptable if the image of the near region and the image of the far region are separated from each other instead of connected.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle environment recognizing apparatus. Accordingly, these terms, as utilized to describe the present invention should be interpreted relative to a vehicle equipped with the vehicle environment recognizing apparatus. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle environment recognizing apparatus comprising:
    an image capturing device configured to capture an image of a road on which a vehicle is traveling;

a road shape calculating section configured to calculate approximation lines that approximate a shape of the road in at least two regions that are located at different distances in front of the vehicle based on image data captured by the image capturing device;

a straight road determining section configured to determine whether the road on which the vehicle is traveling is straight based on a degree to which the approximation lines of the regions calculated by the road shape calculating section match one another;

a parallel travel determining section configured to determine whether the vehicle is traveling parallel to the road based on a detection result determined from the image data captured by the image capturing device and the approximation lines calculated by the road shape calculating section;

an imaginary vanishing point calculating section configured to calculate an imaginary vanishing point using an intersection point between a left approximation line and a right approximation line of the approximation lines upon determining that the road on which the vehicle is traveling is straight and that the vehicle is traveling parallel to the road; and an optical axis direction revising section configured to estimate an estimated optical axis direction of the image capturing device based on a calculation result of the imaginary vanishing point calculating section and revise a preset value of an optical axis direction.

2. The vehicle environment recognizing apparatus recited in claim 1, wherein
the road shape calculating section is further configured to divide the road on which the vehicle is traveling into a left region and a right region that are centered on the vehicle;
the road shape calculating section is further configured to calculate the approximation lines expressing the shape of the road in each of the left and right regions; and
the straight road determining section is further configured to determine whether the road on which the vehicle is traveling is straight based on a difference between an intersection point of the left and right approximation lines calculated based on image data of a far region of the at least two regions and an intersection point of the left and right approximation lines calculated based on image data of a near region of the at least two regions.

3. The vehicle environment recognizing apparatus recited in claim 1, wherein
the road shape calculating section is further configured to divide a road on which the vehicle is traveling into a left region and a right region that are centered on the vehicle;
the road shape calculating section is further configured to calculate approximation lines expressing the shape of the road in each of the left and right regions; and
the straight road determining section is further configured to determine whether the road on which the vehicle is traveling is straight by determining a degree to which the approximation lines of a far region and a near region of the at least two regions on at least one of the left and right sides match one another.

4. The vehicle environment recognizing apparatus recited in claim 1, further comprising
a yaw rate measuring section configured to measure a yaw rate of the vehicle, and
the optical axis direction revising section stopping revision of the estimated optical axis direction upon a yaw rate value measured by the yaw rate measuring section exceeding a preset threshold value and upon the straight road determining section determining that the road on which the vehicle is traveling is straight and the parallel travel determining section determining that the vehicle is traveling parallel to the road.

5. The vehicle environment recognizing apparatus recited in claim 1, further comprising
a lateral acceleration measuring section configured to measure a lateral acceleration of the vehicle, and
the optical axis direction revising section stopping revision of the estimated optical axis direction upon a lateral acceleration value measured by the lateral acceleration measuring section exceeding a preset threshold value and upon the straight road determining section determining that the road on which the vehicle is traveling is straight and the parallel travel determining section determining that the vehicle is traveling parallel to the road.

6. The vehicle environment recognizing apparatus recited in claim 1, wherein
the optical axis direction revising section integrates a difference between the estimated optical axis direction and a stored optical axis direction stored in the vehicle environment recognizing apparatus to obtain an integration result, and
the optical axis direction revising section further revises the stored optical axis direction if an absolute value of the integration result is equal to or larger than a preset threshold value after the imaginary vanishing point has been calculated a preset number of times.

7. The vehicle environment recognizing apparatus recited in claim 6, wherein
the optical axis direction revising section is further configured to revise a yaw direction component and a pitch direction component of the optical axis direction independently by calculating separate differences for the yaw and pitch direction components of the optical axis direction, and integrating the differences for the yaw and pitch direction components of the optical axis direction separately to obtain separate integration values for each component direction.

8. The vehicle environment recognizing apparatus recited in claim 6, wherein
the optical axis direction revising section is further configured to determine a reliability degree of the imaginary vanishing point based on a detection circumstance of the image capturing device and a determination as to whether the imaginary vanishing point was calculated based in part on a detection result of a vehicle sensor, and
the optical axis direction revising section is further configured to vary the preset number of times for checking if the integration result is equal to or larger than the preset threshold value based on the reliability degree.

9. A vehicle environment recognizing apparatus comprising:
image capturing means for capturing an image of a road on which a vehicle is traveling;
road shape calculating means for calculating approximation lines that approximate a shape of the road in at least two regions that are located at different distances in front of the vehicle based on image data captured by the image capturing means;
straight road determining means for determining whether the road on which the vehicle is traveling is straight based on a degree to which the approximation lines of the regions calculated by the road shape calculating means match one another;

parallel travel determining means for determining whether the vehicle is traveling parallel to the road based on a detection result determined from the image data captured by the image capturing means and the approximation lines calculated by the road shape calculating means;

imaginary vanishing point calculating means for calculating an imaginary vanishing point using an intersection point between a left approximation line and a right approximation line of the approximation lines upon determining that the road on which the vehicle is traveling is straight and that the vehicle is traveling parallel to the road; and optical axis direction revising means for estimating an estimated optical axis direction of the image capturing means based on a calculation result of the imaginary vanishing point calculating means and for revising a preset value of an optical axis direction.

10. A vehicle environment recognizing method comprising:

capturing image data of a road on which a vehicle is traveling using an image capturing device;

dividing the image data of the road on which the vehicle is traveling into at least two regions that are located at different distances in front of the vehicle;

calculating approximation lines approximating a shape of the road in each of the at least two regions;

calculating a degree to which the approximation lines of the at least two regions match one another;

determining whether the road on which the vehicle is traveling is straight based on a calculated matching degree of the approximation lines of the at least two regions;

determining whether the vehicle is traveling parallel to the road based on a detection result determined from the image data captured and the approximation lines calculated;

calculating an imaginary vanishing point using an intersection point between a left approximation line and a right approximation line of the approximation lines upon determining that the road on which the vehicle is traveling is straight and that the vehicle is traveling parallel to the road; and estimating an estimated optical axis direction of the image capturing device based on the imaginary vanishing point calculated and revising a preset value of an optical axis direction.

11. The vehicle environment recognizing apparatus recited in claim 1, wherein the parallel travel determining section is configured to determine that the vehicle is traveling parallel to the road when a lateral velocity of the vehicle with respect to the road is equal to or smaller than a set prescribed value.

12. The vehicle environment recognizing apparatus recited in claim 9, wherein the parallel travel determining means determines that the vehicle is traveling parallel to the road when a lateral velocity of the vehicle with respect to the road is equal to or smaller than a set prescribed value.

13. The vehicle environment recognizing method recited in claim 10, wherein the determining of whether the vehicle is traveling parallel to the road includes determining that the vehicle is traveling parallel to the road when a lateral velocity of the vehicle with respect to the road is equal to or smaller than a set prescribed value.

\* \* \* \* \*